US 6,643,502 B1

(12) United States Patent
Van De Plassche et al.

(10) Patent No.: US 6,643,502 B1
(45) Date of Patent: Nov. 4, 2003

(54) MULTI-STANDARD RECEPTION

(75) Inventors: Rudy J. Van De Plassche, Eindhoven (NL); Alphons A. M. L. Bruekers, Eindhoven (NL); Gerardus C. M. Gielis, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/121,576

(22) Filed: Jul. 23, 1998

(30) Foreign Application Priority Data

Jul. 25, 1997 (EP) .............................. 97202340
Aug. 20, 1997 (EP) .............................. 97202556

(51) Int. Cl.$^7$ ................................... H04B 1/16
(52) U.S. Cl. ................... 455/339; 455/313; 455/323; 455/324; 348/735
(58) Field of Search ........................ 455/84, 86, 310, 455/311, 313, 314, 315, 316, 318, 324, 323, 307, 186.1, 266, 338, 339, 190.1, 180.1, 180.4, 182.2, 188.1, 188.2; 348/38, 555, 731, 735

(56) References Cited

U.S. PATENT DOCUMENTS

| 4,271,529 A | * | 6/1981 | Strammello, Jr. ......... 455/180.4 |
| 4,379,271 A | * | 4/1983 | Lehmann ..................... 331/49 |
| 4,402,089 A | * | 8/1983 | Knight et al. ............. 455/186.1 |
| 4,408,348 A | * | 10/1983 | Theriault .................. 455/180.1 |
| 4,518,993 A | * | 5/1985 | Okada et al. ............... 380/220 |
| 4,710,974 A | * | 12/1987 | Kupfer .................... 455/190.1 |
| 4,850,038 A | * | 7/1989 | Shibata et al. ............... 455/315 |
| 5,230,011 A |   | 7/1993 | Gielis et al. ................... 375/97 |
| 5,784,414 A |   | 7/1998 | Bruekers et al. ............ 375/324 |
| 5,881,369 A | * | 3/1999 | Dean ........................... 455/86 |

FOREIGN PATENT DOCUMENTS

EP            0696854 A1    2/1996

OTHER PUBLICATIONS

Patent Abstracts of Japan, abstract of JP 3–60225A (Hitachi Ltd), Mar. 15, 1991.

* cited by examiner

*Primary Examiner*—Charles Appiah

(57) ABSTRACT

In a receiver, a tuner (TUN) converts a reception signal (Srf) to an intermediate-frequency signal (Sif). An adjustable frequency converter (AFRC) converts the intermediate-frequency signal (Sif) to an input signal (Sin) for a filter arrangement (FIL) which is capable of providing various frequency responses (Hfil1, Hfil2) associated with different transmission standards. The adjustable frequency converter (AFRC) and the filter arrangement (FIL) may form part of an integrated receiver-circuit (IRC) suitable for many different transmission standards. The tuner (TUN) may provide the intermediate-frequency signal (Sif) at any one of various different intermediate frequencies (IF1, IF2). For any intermediate frequency (IF1,IF2), the adjustable frequency converter (AFRC) can be adjusted in such a way that the filter arrangement (FIL) receives the input signal (Sin) in a frequency range (FR) which is suitably located with respect to its frequency responses (Hfil1, Hfil2). Thus, the adjustable frequency converter (AFRC) allows the use of any one of various different intermediate frequencies and, therefore, allows the use of relatively cheap standard-specific tuners. Thus, it allows relatively cost-efficient implementations.

4 Claims, 16 Drawing Sheets

| A(z) | VAL (DEC) | | VAL (CSD) | |
|---|---|---|---|---|
| i = | Ax(z) | Ay(z) | Ax(z) | Ay(z) |
| 0 | -0.04296875 | -0.0234375 | 0.000T0101 | 0.00000T01 |
| 1 | 0.00000000 | 0.0000000 | 0.00000000 | 0.0000000 |
| 2 | -0.18750000 | 0.2265625 | 0.0T010000 | 0.0100T01 |
| 3 | 0.50000000 | 0.0000000 | 0.10000000 | 0.0000000 |
| 4 | -0.18750000 | -0.2265625 | 0.0T010000 | 0.0T0010T |
| 5 | 0.00000000 | 0.0000000 | 0.00000000 | 0.0000000 |
| 6 | -0.04296875 | 0.0234375 | 0.000T0101 | 0.000010T |

FIG. 6a

| C(z) | i= | VAL(DEC) | VAL(CSD) |
|---|---|---|---|
| | 0 , 10 | 0.031250 | 0.000010 |
| | 1 , 9 | 0.000000 | 0.000000 |
| | 2 , 8 | -0.093750 | 0.00T010 |
| | 3 , 7 | -0.015625 | 0.00000T |
| | 4 , 6 | 0.312500 | 0.010100 |
| | 5 | 0.531250 | 0.100010 |

| i= | VAL(DEC) | | VAL(CSD) | |
|---|---|---|---|---|
| | Dx(z) | Dy(z) | Dx(z) | Dy(z) |
| 0 | 0.0000000000 | -0.00048828125 | 0.0000000000 | 0.000000000T |
| 2 | 0.0000000000 | -0.0014648437 | 0.0000000000 | 0.00000000T01 |
| 4 | 0.0000000000 | -0.003417796875 | 0.0000000000 | 0.0000000T001 |
| 6 | 0.0000000000 | -0.006835937500 | 0.0000000000 | 0.000000T0010 |
| 8 | 0.0000000000 | -0.011717187500 | 0.0000000000 | 0.00000T01000 |
| 10 | 0.0000000000 | -0.019531250000 | 0.0000000000 | 0.00000T0T000 |
| 12 | 0.0000000000 | -0.031738281250 | 0.0000000000 | 0.0000T00000T |
| 14 | 0.0000000000 | -0.052734375000 | 0.0000000000 | 0.000T0010100 |
| 16 | 0.0000000000 | -0.981445312500 | 0.0000000000 | 0.00T0100T00T |
| 18 | 0.0000000000 | -0.310546875000 | 0.100000T00T | 0.0T0T0000100 |
| 19 | 0.4912109375 | 0.000000000000 | 0.0000000000 | 0.00000000000 |
| 20 | 0.0000000000 | 0.310546875000 | 0.0000000000 | 0.0101000T00 |
| 22 | 0.0000000000 | 0.981445312500 | 0.0000000000 | 0.0010T001001 |
| 24 | 0.0000000000 | 0.052734375000 | 0.0000000000 | 0.000100T0T00 |
| 26 | 0.0000000000 | 0.031738281250 | 0.0000000000 | 0.00001000001 |
| 28 | 0.0000000000 | 0.019531250000 | 0.0000000000 | 0.0000101000 |
| 30 | 0.0000000000 | 0.011718750000 | 0.0000000000 | 0.0000010T000 |
| 32 | 0.0000000000 | 0.006835937500 | 0.0000000000 | 0.00000100T0 |
| 34 | 0.0000000000 | 0.003417796875 | 0.0000000000 | 0.00000100T |
| 36 | 0.0000000000 | 0.0014648437 | 0.0000000000 | 0.00000010T |
| 38 | 0.0000000000 | 0.00048828125 | 0.0000000000 | 0.00000000001 | i=1,3,5,...,37 : a(i)=0

FIG. 9a

| Ek0 | i= | VAL(DEC) | VAL(CSD) |
|---|---|---|---|
| | 0 , 16 | -0.0156250 | 0.00000T0 |
| | 1 , 15 | 0.0468750 | 0.00010T0 |
| | 2 , 14 | -0.0468750 | 0.000T010 |
| | 3 , 13 | 0.0000000 | 0.0000000 |
| | 4 , 12 | 0.0468750 | 0.00010T0 |
| | 5 , 11 | -0.0156250 | 0.00000T0 |
| | 6 , 10 | -0.1250000 | 0.00T0000 |
| | 7 , 9 | 0.3046875 | 0.010100T |
| | 8 | 0.6250000 | 0.1010000 |

| Ek1 | i= | VAL(DEC) | VAL(CSD) |
|---|---|---|---|
| | 0 , 18 | -0.0312500 | 0.0000T00 |
| | 1 , 17 | -0.0078125 | 0.000000T |
| | 2 , 16 | 0.0390625 | 0.0000101 |
| | 3 , 15 | -0.0234375 | 0.0000T01 |
| | 4 , 14 | -0.0156250 | 0.00000T0 |
| | 5 , 13 | 0.0781250 | 0.0001010 |
| | 6 , 12 | -0.0468750 | 0.000T010 |
| | 7 , 11 | -0.1093750 | 0.00T0010 |
| | 8 , 10 | 0.2968750 | 0.01010T0 |
| | 9 | 0.6171875 | 0.101000T |

Em

| i= | VAL(DEC) | VAL(CSD) |
|---|---|---|
| 0 , 18 | 0.03515625 | 0.00001001 |
| 1 , 17 | -0.04687500 | 0.000T0100 |
| 2 , 16 | 0.00390625 | 0.00000001 |
| 3 , 15 | 0.01562500 | 0.00000100 |
| 4 , 14 | 0.02734375 | 0.0000100T |
| 5 , 13 | -0.00390625 | 0.0000000T |
| 6 , 12 | -0.09765625 | 0.00T0100T |
| 7 , 11 | 0.00000000 | 0.00000000 |
| 8 , 10 | 0.38281250 | 0.10T00010 |
| 9 | 0.38281250 | 0.10T00010 |

FIG. 13a

| i= | VAL(DEC) | | VAL(CSD) | |
|---|---|---|---|---|
| | Gx(z) | Gy(z) | Gx(z) | Gy(z) |
| 0 | 0.000000000 | 0.007812500 | 0.000000000 | 0.000000100 |
| 1 | 0.000000000 | 0.000000000 | 0.000000000 | 0.000000000 |
| 2 | -0.054687500 | 0.017578125 | 0.000T00100 | 0.000001001 |
| 3 | 0.000000000 | 0.000000000 | 0.000000000 | 0.000000000 |
| 4 | -0.189453125 | -0.261718750 | 0.0T010000T | 0.0T000T010 |
| 5 | 0.546875000 | 0.000000000 | 0.10010T000 | 0.000000000 |
| 6 | -0.189453125 | 0.261718750 | 0.0T010000T | 0.0100010T0 |
| 7 | 0.000000000 | 0.000000000 | 0.000000000 | 0.000000000 |
| 8 | -0.054687500 | -0.017578125 | 0.000T00100 | 0.00000T00T |
| 9 | 0.000000000 | 0.000000000 | 0.000000000 | 0.000000000 |
| 10 | 0.000000000 | -0.007812500 | 0.000000000 | 0.000000T00 |

Heur(z)

| i= | VAL(DEC) | VAL(CSD) |
|---|---|---|
| 0 , 18 | 0.0156250 | 0.0000010 |
| 1 , 17 | 0.0078125 | 0.0000001 |
| 2 , 16 | -0.0234375 | 0.0000T01 |
| 3 , 15 | -0.0156250 | 0.00000T0 |
| 4 , 14 | 0.0468750 | 0.00010T0 |
| 5 , 13 | 0.0234375 | 0.000010T |
| 6 , 12 | -0.0859375 | 0.00T0101 |
| 7 , 11 | -0.0156250 | 0.00000T0 |
| 8 , 10 | 0.3125000 | 0.0101000 |
| 9 | 0.5156250 | 0.1000010 |

| Hus(z) | i= | VAL(DEC) | VAL(CSD) |
|---|---|---|---|
| | 0, 16 | -0.01171875 | 0.00000T01 |
| | 1, 15 | -0.00781250 | 0.000000T0 |
| | 2, 14 | 0.02343750 | 0.000010T0 |
| | 3, 13 | 0.03125000 | 0.00001000 |
| | 4, 12 | -0.03125000 | 0.0000T000 |
| | 5, 11 | -0.07812500 | 0.000T0T00 |
| | 6, 10 | 0.04687500 | 0.00010T00 |
| | 7, 9 | 0.29687500 | 0.01010T00 |
| | 8 | 0.43750000 | 0.100T0000 |

MULTI-STANDARD RECEPTION

FIELD OF THE INVENTION

The invention relates to the reception of signals which are transmitted in accordance with different standards. For example, television (TV) signals are transmitted in accordance with different standards depending on the country or region and/or depending on the type of transmission which may be analog or digital, via cable, satellite or a terrestrial path.

BACKGROUND ART

EP-A 0,696,854 describes a prior-art multi-standard TV receiver. In this receiver, a tuner output signal passes through a surface-acoustic wave filter with a center frequency of 140 MHz which suppresses a great many of adjacent channel signal components. A subsequent mixer stage realizes a frequency transposition so as to obtain a down-converted intermediate-frequency signal of about 75 MHz. The down-converted intermediate-frequency signal is applied to an automatic gain-control amplifier having an internal bandpass limitation, before the down-converted intermediate-frequency signal is applied to the input of an A/D converter. A subsequent band-pass filter having an adaptively controlled bandwidth selects the desired signal with a minimal remainder of the adjacent channel signal components.

SUMMARY OF THE INVENTION

It is an object of the invention to provide multi-standard reception which, with respect to the background art receiver, allows more cost-efficient implementations. claims 1 and 5 define a receiver and an integrated receiver-circuit, respectively, in accordance with the invention. Additional features, which may be optionally used to implement the invention to advantage, are defined in the dependent claims.

The invention takes the following aspects into consideration. In a multi-standard receiver, it is possible to convert reception signals transmitted in accordance with different standards to a common intermediate frequency for further processing. The prior-art receiver described hereinbefore as background art is an example of this approach. It requires a tuner, or a group of tuners, which correctly processes the reception signals transmitted in accordance with different standards and converts them to the common intermediate frequency.

In the prior-art receiver, the common intermediate frequency does not correspond to any intermediate frequency which is typically used for a particular transmission standard or a group of transmission standards. Consequently, the tuner which forms part of the prior-art receiver is not suited for applications other than multi-standard reception. Since multi-standard receivers are produced in relatively small numbers, the tuner will be relatively expensive due to lack of economy of scale.

But even if, in the prior-art receiver, the common intermediate frequency corresponded to a typically used intermediate frequency, the tuner would still be relatively expensive due to lack of economy of scale. The tuner would include a substantial amount of circuitry to allow multi-standard reception, which would make it too expensive for applications other than multi-standard reception in which such circuitry is redundant. In a single-standard receiver, one will rather use a relatively inexpensive standard-specific tuner for converting reception signals to the intermediate frequency typically used for the transmission standard in question.

In accordance with the invention, an adjustable frequency converter converts an intermediate-frequency signal provided by a tuner into an input signal for a filter arrangement which is capable of providing various frequency responses associated with different transmission standards. The adjustable frequency converter effectively shifts the intermediate-frequency signal in frequency by an amount which is adjustable to obtain the input signal for the filter arrangement. For any one of a large number of different intermediate frequencies, the adjustable frequency converter can be adjusted in such a way that the filter arrangement receives the input signal in a frequency range which is suitably located with respect to the frequency responses it provides. Consequently, in a multi-standard application, an assembly of standard-specific tuners may be used, each of which converts a reception signal to a different intermediate frequency which is typically used for a particular transmission standard or a group of transmission standards. In many applications, such an assembly of standard-specific tuners will be cheaper, for reasons of economy of scale, than a dedicated multi-standard tuner which is required in the background art. Thus, the invention allows more cost-efficient implementations.

The invention may wholly or partially be implemented as an integrated circuit. For example, the adjustable frequency converter and the filter arrangement may form part of an integrated receiver-circuit for processing intermediate-frequency signals provided by a tuner. Such an integrated-receiver circuit is suitable for relatively many different transmission standards. Consequently, it can be used not only in multi-standard receivers, but also in relatively many different single-standard receivers. Thus, the invention allows an integrated receiver-circuit which is versatile and, therefore, will find a wide range of application such that it can benefit from an economy of scale.

The intention and additional features, which may be optionally used to implement the invention to advantage, are apparent from and will be elucidated with reference to the drawings described hereinafter.

BRIEF DESCRIPTION OF THE DRAWINGS

FIGS. 6a, 7a, . . . , 15a are tables listing examples of suitable coefficients for filters in the FIG. 5 receiver; and FIGS. 6b, 7b, . . . , 15b are graphs showing frequency responses associated with the filter coefficients listed in the FIGS. 6a, 7a, . . . , 15a tables, respectively.

DETAILED DESCRIPTION OF THE DRAWINGS

First, some remarks will be made on the use of reference signs. Similar entities are denoted by an identical lettercode throughout the drawings. In a single drawing, various similar entities may be shown. In that case, a numeral is added to the letter code, to distinguish similar entities from each other. The numeral will be between parentheses if the number of similar entities is a running parameter. In the description and the claims, any numeral in a reference sign may be omitted if this is appropriate.

Figure 1:
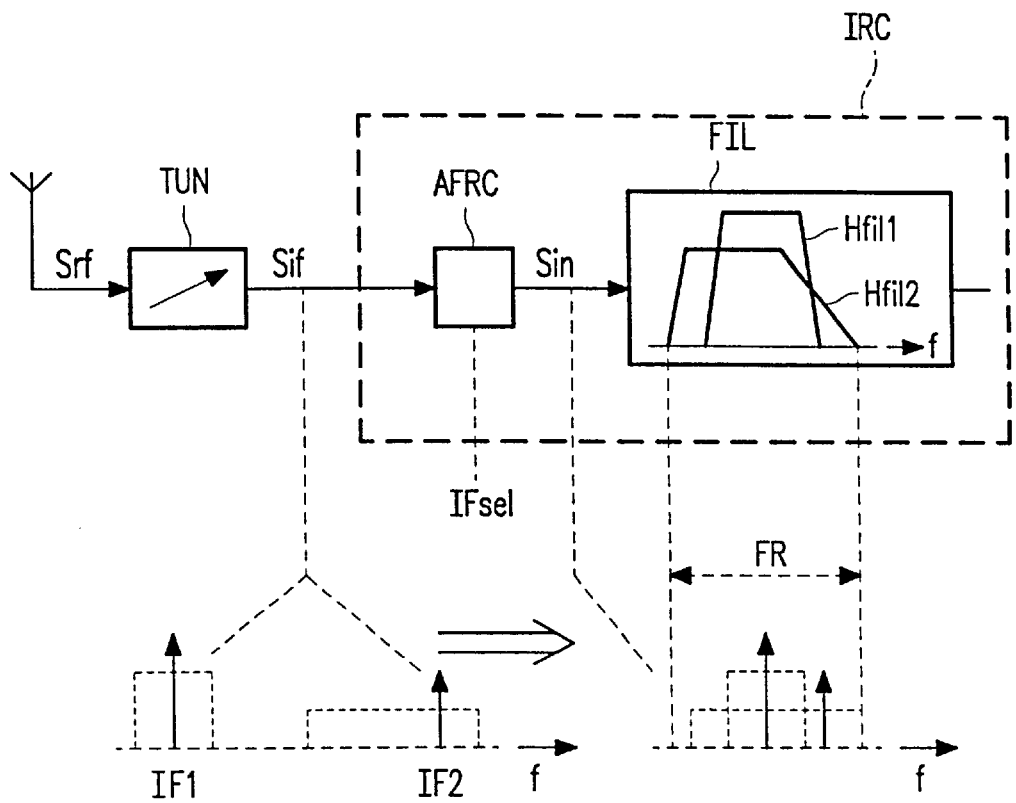
FIG. 1 is a conceptual diagram illustrating basic features of the invention as claimed in claim 1.

FIG. 1 illustrates basic features of the invention in solid lines. A tuner TUN converts a reception signal Srf to an intermediate-frequency signal Sif. An adjustable frequency converter AFRC converts the intermediate-frequency signal Sif to an input signal Sin for a filter arrangement FIL. The filter arrangement FIL is capable of providing various frequency responses Hfil1, Hfil2 associated with different transmission standards.

FIG. 1 also illustrates the following features in broken lines. The adjustable frequency converter AFRC and the filter arrangement FIL may form part of an integrated receiver-circuit IRC suitable for many different transmission standards. The tuner TUN may provide the intermediate-frequency signal Sif at any one of various different intermediate frequencies IF1, IF2. For any intermediate frequency IF1, IF2, the adjustable frequency converter AFRC can be adjusted in such a way that the filter arrangement FIL receives the input signal Sin in a frequency range FR which is suitably located with respect to its frequency responses Hfil1, Hfil2. For that purpose, a control signal IFsel may be used which determines the frequency conversion carried out by the adjustable frequency converter AFRC. The control signal IFsel may be provided by a controller which is not shown.

Figure 2:
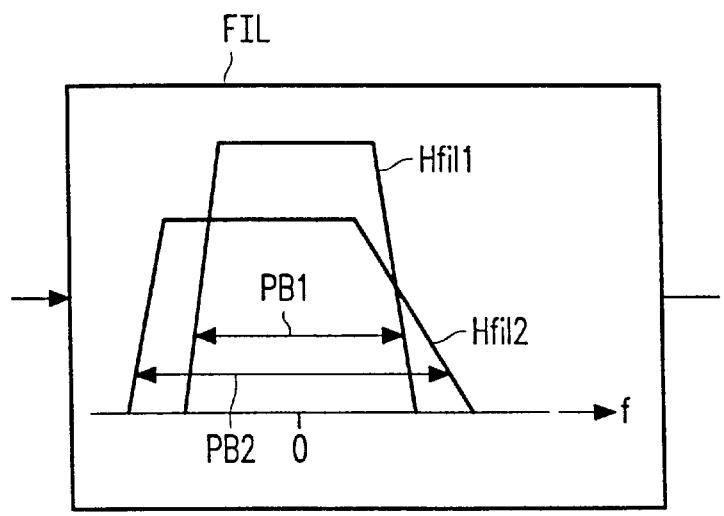
FIGS. 2 to 4 are conceptual diagrams illustrating additional features as claimed in claims 2 to 4, respectively.

FIG. 2 illustrates the following feature. The frequency responses Hfil1, Hfil2 provided by the filter arrangement FIL have passbands PB1, PB2 which include zero (0) frequency. That is, the frequency responses Hfil1 and Hfil2 have low-pass characteristics.

The FIG. 2 feature takes the following aspects into consideration. It is preferable that the filter arrangement FIL substantially suppresses signals which are adjacent in frequency to a desired signal. Such signals will hereinafter be referred to as adjacent-frequency signals. If, in contrast, adjacent-frequency signals were greatly suppressed in an intermediate-frequency path between the tuner and the adjustable frequency converter, a plurality of filters would be required in multi-standard applications which would be rather expensive.

To sufficiently suppress adjacent-frequency signals, the filter arrangement FIL needs to provide a frequency response which has a sufficiently large difference in magnitude between, on the one hand, a frequency range in which the desired signal is located and, on the other hand, a frequency range in which adjacent-frequency signals may be located. This means that the frequency response has a magnitude-slope between the two frequency ranges which will hereinafter be referred to as passband and stopband, respectively. The higher the center frequency of the passband, the steeper the magnitude-slope needs to be for a certain difference in magnitude between the passband and the stopband. In general, it holds that more complicated circuitry is required to realize a steeper magnitude-slope.

If the FIG. 2 feature is applied, the passband will have a relatively low center frequency. Consequently, a relatively gentle magnitude-slope will be sufficient to adequately suppress any adjacent-frequency signals located in the stopband. This allows the filter arrangement FIL to be implemented with relatively simple circuitry. Moreover, it allows the filter arrangement FIL to be implemented in an integrated-circuit form. Thus, the FIG. 2 feature contributes to cost-efficiency.

Figure 3:
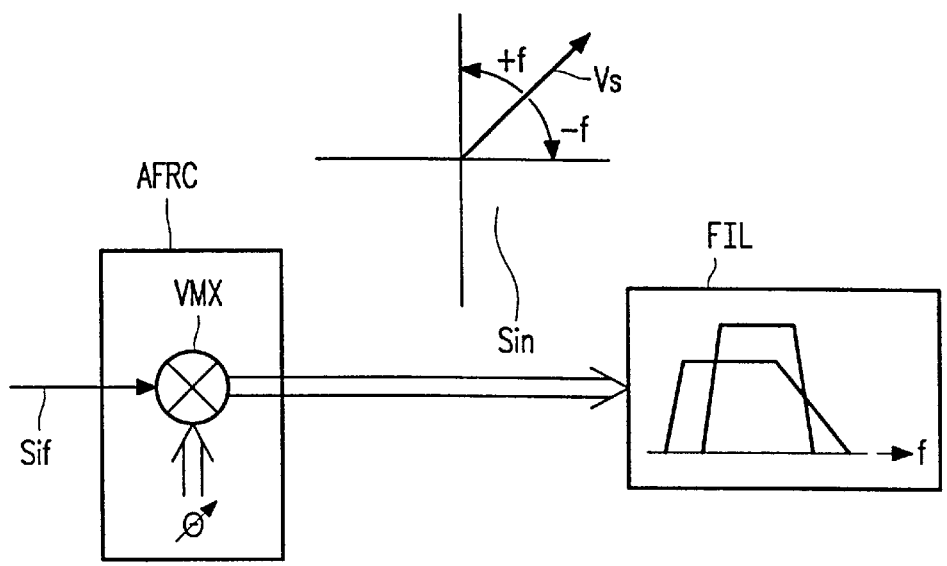

FIG. 3 illustrates the following feature. The adjustable frequency converter AFRC comprises a vectorial mixer VMX. It effectively multiplies the intermediate-frequency signal Sif by a vectorial signal having a single mixing frequency $\theta$. The result of this multiplication constitutes the input signal Sin for the filter arrangement FIL. In FIG. 3, an illustration of the input signal Sin is given by means of a signal vector Vs. The signal vector Vs represents a state of the input signal Sin at a certain instant. A counter-clockwise rotation of the signal vector Vs can be regarded as a positive frequency +f, and a clockwise rotation as a negative frequency -f.

The FIG. 3 feature takes the following aspects into consideration. If the mixing frequency $\theta$ is within a frequency range occupied by the spectrum of the intermediate-frequency signal Sif, the spectrum will be effectively cut into two portions. One portion of the spectrum will be above the mixing frequency $\theta$ which means that a spectral component in this portion has a positive frequency difference. The other portion of the spectrum will be below the mixing frequency $\theta$, which means that a spectral component in this portion has a negative frequency difference. If the two portions of the spectrum are not fully symmetrical, a distinction between spectral components having positive frequency differences and negative frequency differences should be made in order to avoid any distortion of information comprised in the intermediate-frequency signal Sif.

If the FIG. 3 feature is applied, the input signal Sin for the filter arrangement FIL will be in a vectorial form as illustrated in FIG. 3. Consequently, a distinction can be made between spectral components of the intermediate-frequency signal Sif which have positive and negative frequency differences with respect to the mixing frequency $\theta$. The mixing frequency $\theta$ may thus fall within the frequency range occupied by the spectrum of the intermediate-frequency signal Sif without this causing a serious loss or distortion of information. Thus, the FIG. 3 feature allows a relatively great freedom of choice with regard to the frequency conversion carried out by the adjustable frequency converter AFRC.

Figure 4:
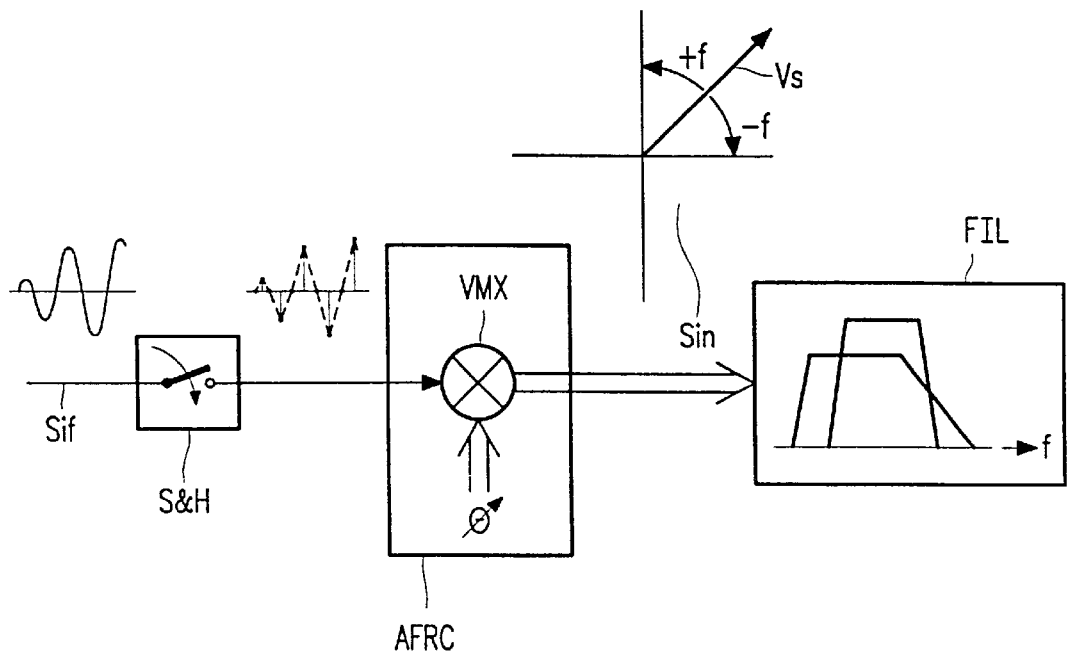

FIG. 4 illustrates the following feature. A sampling circuit S&H applies the intermediate-frequency signal Sif to the vectorial mixer VMX in a time-discrete form.

FIG. 4 also illustrates the input signal Sin which is applied, in a vectorial form, by the vectorial mixer VMX to the filter arrangement FIL as explained hereinbefore in connection with FIG. 3. similarly as in FIG. 3, the signal vector Vs represents a state of the input signal Sin at a certain instant.

The FIG. 4 feature takes the following aspects into consideration. In a practical implementation, the vectorial mixer VMX will provide two output signals. One signal will define the position of the signal vector Vs with respect to the horizontal axis, and the other signal will define the position of the signal vector Vs with respect to the vertical axis. In other words, the two signals constitute an x-component and an y-component, respectively, of the input signal Sin in its vectorial form. If the two signals are not precisely mutually orthogonal, a perfect distinction between positive and negative frequencies cannot be made. This may adversely affect the quality of reception, particularly when the vectorial mixer VMX provides the input signal Sin in a frequency range which includes zero (0) frequency.

If the FIG. 4 feature is applied, the vectorial mixer VMX can operate in a time-discrete manner. This allows it to establish a very accurate 90-degree phase-relationship between the two signals forming the x-component and the y-component of the input signal Sin in its vectorial form. Consequently, a good distinction between positive and negative frequencies can be made. Thus, the FIG. 4 feature contributes to quality of reception.

Figure 5:
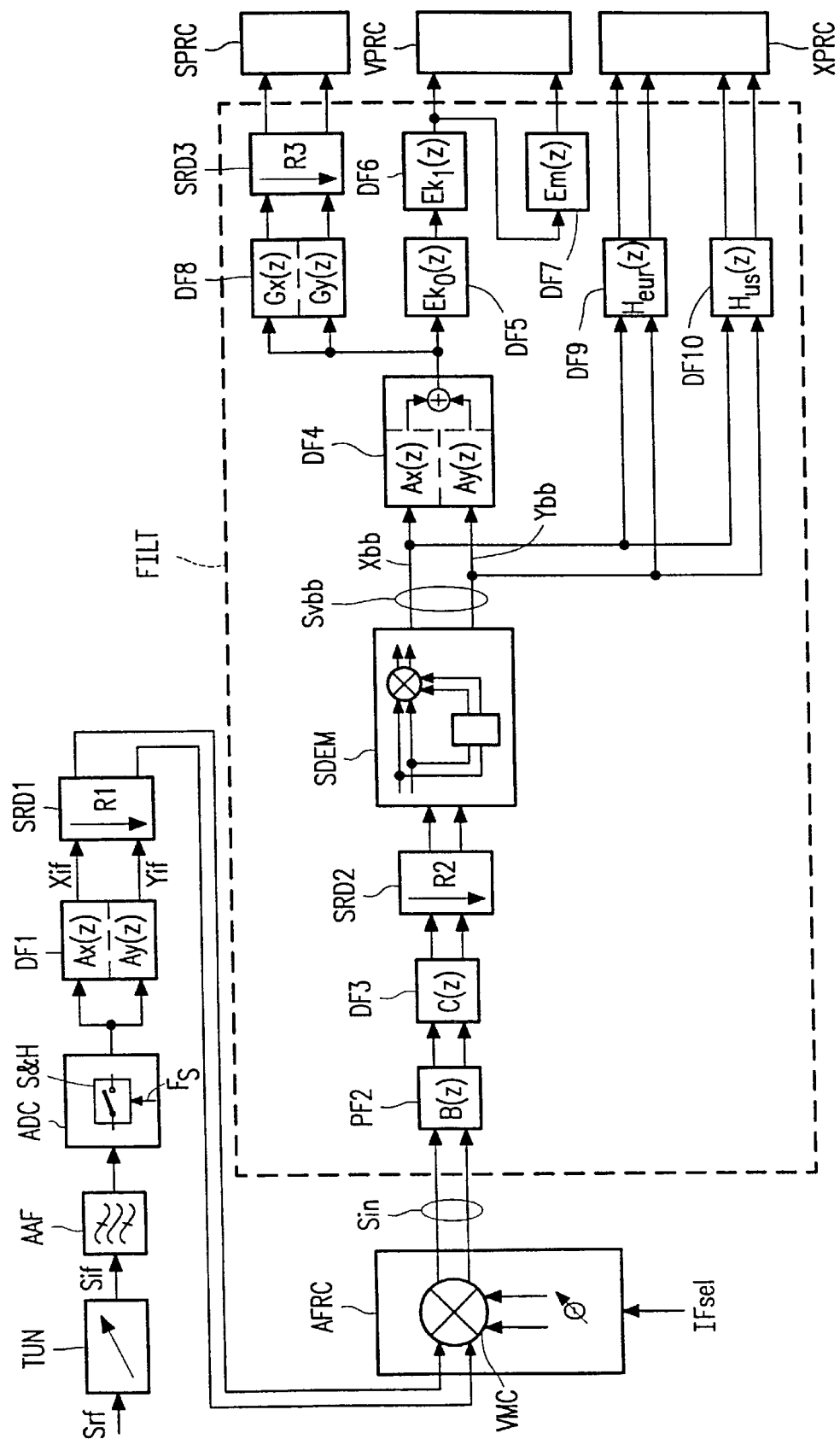
FIG. 5 is a block diagram of an example of a receiver in accordance with the invention.

FIG. 5 illustrates an example of a TV receiver in accordance with the invention, which includes the features shown in FIGS. 1 to 4 and has been described hereinbefore in connection with these Figures. In the FIG. 5 receiver, the following additional elements are coupled between the tuner TUN and the controllable frequency converter AFRC: an anti-aliasing filter AAF, an analog-to-digital converter ADC which includes the sampling circuit S&H, a digital filter DF1 and a sample-rate decreaser SRD1. The filter arrangement FIL includes various digital filters DF2–DF10, two sample-rate decreasers SRD2, SRD3, and a synchronous demodulator SDEM. The filter arrangement FIL provides output signals which are further processed in a sound processor SPRC, a video processor VPRC or a symbol processor XPRC.

The FIG. 5 receiver operates as follows. The tuner TUN is tuned to the reception signal Srf which may be located at any channel in a TV band of interest. In response, the tuner TUN provides the intermediate-frequency signal Sif at one of the typically used intermediate frequencies listed below.

|  | analog terrestrial TV transmissions | digital cable TV transmissions |
|---|---|---|
| Europe | 38.90 MHz | 36.15 MHz |
| America | 45.75 MHz | 43.75 MHz |
| Japan | 58.75 MHz | 56.50 MHz |

It should be noted that the above-listed intermediate frequencies apply to a main carrier which is comprised in the intermediate-frequency signal Sif.

The intermediate-frequency signal Sif is subjected to an analog-to-digital conversion and a scalar-to-vectorial conversion before it is supplied to the adjustable frequency converter AFRC. These conversions are carried out by the analog-to-digital converter ADC and the digital filter DF1, respectively. The anti-aliasing filter AAF counters aliasing effects due to a sampling at a frequency Fs as part of the analog-to-digital conversion. The sample-rate decreaser SDR1 causes the intermediate-frequency signal to be supplied to the adjustable frequency converter AFRC at a sample rate which is a factor R1 times lower than the sampling frequency Fs.

The scalar-vectorial conversion is achieved by filtering the digitized intermediate-frequency signal in accordance with two different finite impulse responses $Ax(z)$ and $Ay(z)$ provided by the digital filter DF1. The digitized intermediate-frequency signal which has been filtered in accordance with the finite impulse response $Ax(z)$ provides an x-component Xif, and the digitized intermediate-frequency signal which has been filtered in accordance with the finite impulse response $Ay(z)$ provides an y-component Yif. In combination, the x- and y-components Xif,Yif constitute a vectorial representation of the intermediate-frequency signal Sif. The digital filter DF1 also counters aliasing effects caused by the sample-rate decreaser SRD1. WO-A 96/8078 (attorney's docket PHN 15,001) describes a suitable manner of achieving anti-aliasing by means of a digital filter which carries out a scalar-vectorial conversion.

The adjustable frequency converter AFRC shifts the vectorial representation of the intermediate-frequency signal Sif in frequency. The amount of frequency shift is equal to the mixing frequency $\theta$ supplied to the vectorial mixer VMC discussed hereinbefore in connection with FIG. 3. For example, if the vectorial mixer VMX is implemented as a Cordic processor, the mixing frequency $\theta$ will be determined by a z-data generator coupled to the Cordic processor. EP-A 486,095 (attorney's docket PHN 13,500) describes a Cordic processor which is coupled to a z-data generator for carrying out a frequency shift.

The mixing frequency $\theta$ depends on the transmission system for which reception is desired. The table below lists suitable mixing frequencies $\theta$ for various transmission systems.

|  | analog terrestrial TV transmissions | digital cable TV transmissions |
|---|---|---|
| Europe | 35.65 MHz (B/G, I) 34.75 MHz (K) | 36.15 MHz |
| America | 42.50 MHz | 43.75 MHz |
| Japan | 55.50 MHz | 56.50 Mhz |

If the mixing frequency $\theta$ is in accordance with the above table, the input signal Sin for the filter arrangement FIL will have a frequency spectrum which is substantially centered around zero frequency.

In the filter arrangement FIL, digital filters DF2 and DF3 substantially suppress adjacent-frequency signals. Assuming that the frequency spectrum of the input signal Sin is substantially centered around zero frequency, low-pass frequency responses are associated with impulse responses $B(z)$ and $C(z)$ of digital filters DF2 and DF3, respectively.

The sample-rate decreaser SRD2 decreases the sample rate of the input signal Sin. Such a sample rate reduction is allowed because digital filters DF2 and DF3 effectively reduce the bandwidth of the input signal Sin.

The synchronous demodulator SDEM effectively shifts a desired main carrier, which is comprised in the input signal Sin, to zero (0) frequency. As a result, a vectorial baseband-signal Svbb is obtained. It is composed of two components Xbb and Ybb corresponding to an in-phase and a quadrature modulation-component of the main carrier.

The content of the vectorial baseband signal Svbb depends on the standard in accordance with which the reception signal Srf is transmitted. If the reception signal Srf is an analog terrestrial TV transmission, the vectorial baseband signal Svbb will comprise a luminance signal, a chrominance-carrier signal and one or more sound-carrier signals. These signals are multiplexed in frequency in a manner which depends on the standard in accordance with which the analog terrestrial TV transmission takes place. If the reception signal Srf is a digital TV transmission, the vectorial baseband signal Svbb will comprise a stream of symbols. The properties of the stream of symbols will depend on the standard in accordance with which the digital TV transmission takes place.

An assembly of digital filters DF4–DF10 is coupled behind the synchronous demodulator SDEM. Each digital filter DF4–DF10 has a specific task with regard to a particular piece of content which may be comprised in the vectorial baseband signal Svbb. This is explained in more detail below.

Digital filter DF4 compensates a distortion of the luminance signal as a result of vestigial sideband modulation used for analog terrestrial TV transmissions. To this end, digital filter DF4 has a frequency response which includes a Nyquist slope. This can be achieved by filtering the two components Xbb and Ybb of the vectorial baseband signal Svbb in accordance with suitably chosen impulse responses $Dx(z)$ and $Dy(z)$, respectively. Subsequently, the filtered components thus obtained are combined to produce a scalar output signal.

Digital filters DF5, DF6 and DF7 suppress signals other than the luminance signal and the chrominance-carrier signal. In particular, they suppress sound-carrier signals which may be located at different frequencies depending on the standard in accordance with which the analog terrestrial TV transmission takes place. Digital filters DF5 and DF6 suppress sound-carrier signals for transmissions in accordance with the K-standard as well as the B/G- and the I-standard. To this end, low-pass frequency responses with cut-off frequencies of approximately 5 MHz are associated with impulse responses Ek0(z) and Ek1(z) of digital filters DF5 and DF6, respectively. For any of the aforementioned standards, an output signal of digital filter DF6 is taken for further processing in the video processor VPRC. However, for M-standard transmissions, the output signal of digital filter DF6 is additionally filtered by digital filter DF7. Digital filter DF7 has an impulse response Em(z) with which a frequency response is associated with a notch substantially centered around 4.5 MHz in order to suppress any sound carrier at this frequency.

Digital filter DF8 and the sample-rate decreaser SRD3 prepare sound-carrier signals for further processing in the sound processor SPRC. Digital filter DF8 has a frequency response with a passband covering a frequency range in which sound-carrier signals may be located. Furthermore, it converts the scalar output signal of digital filter DF4 to a vectorial signal. To this end, the scalar output signal is filtered in accordance with two different impulse responses Gx(z) and Gy(z). Accordingly, two components are obtained which, in combination, form the vectorial signal. Sample-rate decreaser SRD3 decreases the sample-rate of the vectorial signal by a factor R3. Digital filter DF8 counters any aliasing associated with this sample rate reduction in accordance with the principles described in WO-A 96/8078 (attorney's docket PHN 15,001).

Digital filters DF9 and DF10 filter the stream of symbols in accordance with standards for European and American digital cable TV transmissions, respectively. Digital filter DF9 has an impulse response Heur(z) with which a low-pass frequency response is associated with a cut-off frequency of approximately 4 MHz and a roll-off factor of approximately 0.15. Digital filter DF10 has an impulse response Hus(z) with which a low-pass frequency response is associated with a cut-off frequency of approximately 3 MHz and a roll-off factor of approximately 0.2. Output signals of digital filters DF9 and DF10 are supplied to the symbol processor XPRC for further processing.

The sound processor SPRC, the video processor VPRC, and the symbol processor XPRC may process the signals or symbols supplied thereto in various different manners. A particularly suitable manner of processing sound carrier-signals in the sound processor SPRC is the following. A sound-carrier signal is shifted to zero (0) frequency after which it is filtered by means of low-pass filters and, subsequently, demodulated. EP-A 486,095 (attorney's docket PHN 13,500) describes a receiver comprising a cascade of a first Cordic processor, low-pass filters, and a second Cordic processor. This cascade may be used in the sound processor SPRC to process the sound carrier signal as described hereinbefore. It may also be used in the video processor VPRC to suitably process the chrominance-carrier signal in a similar manner.

Figure 6B:
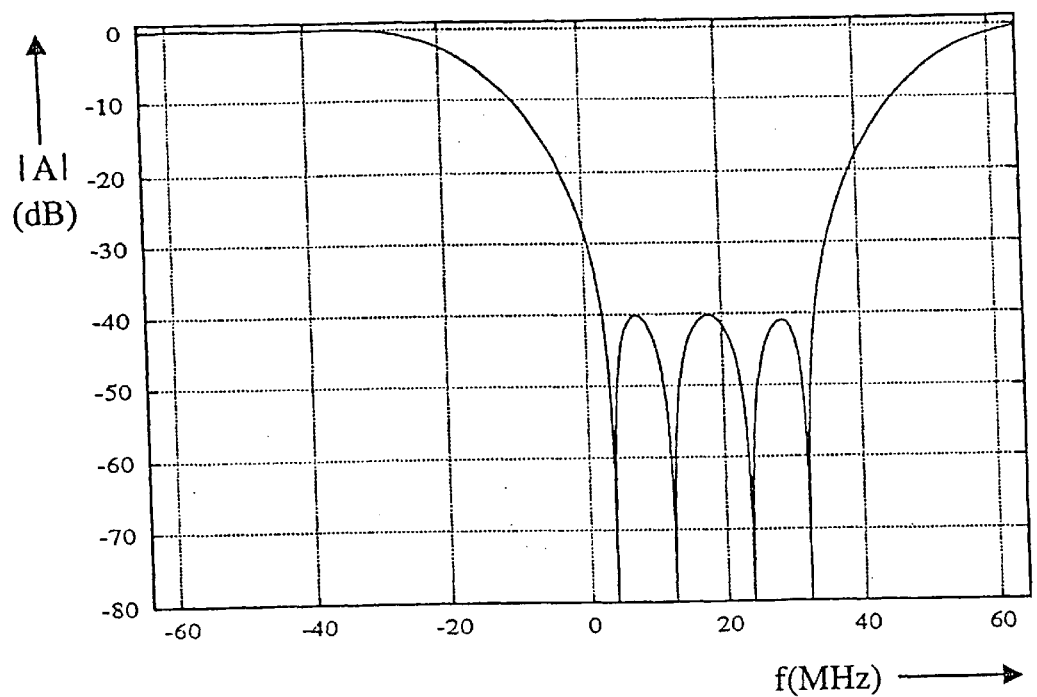
Figures 7A, 7B:
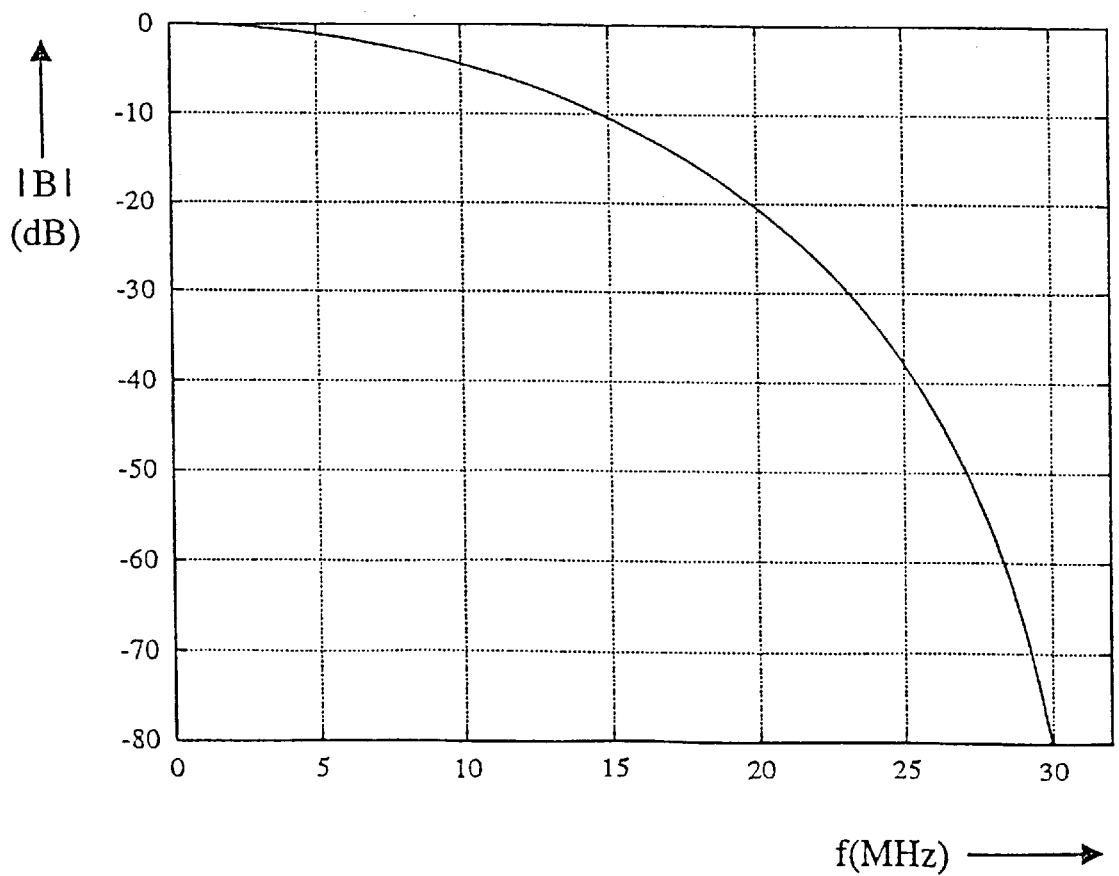
Figures 8A, 8B:
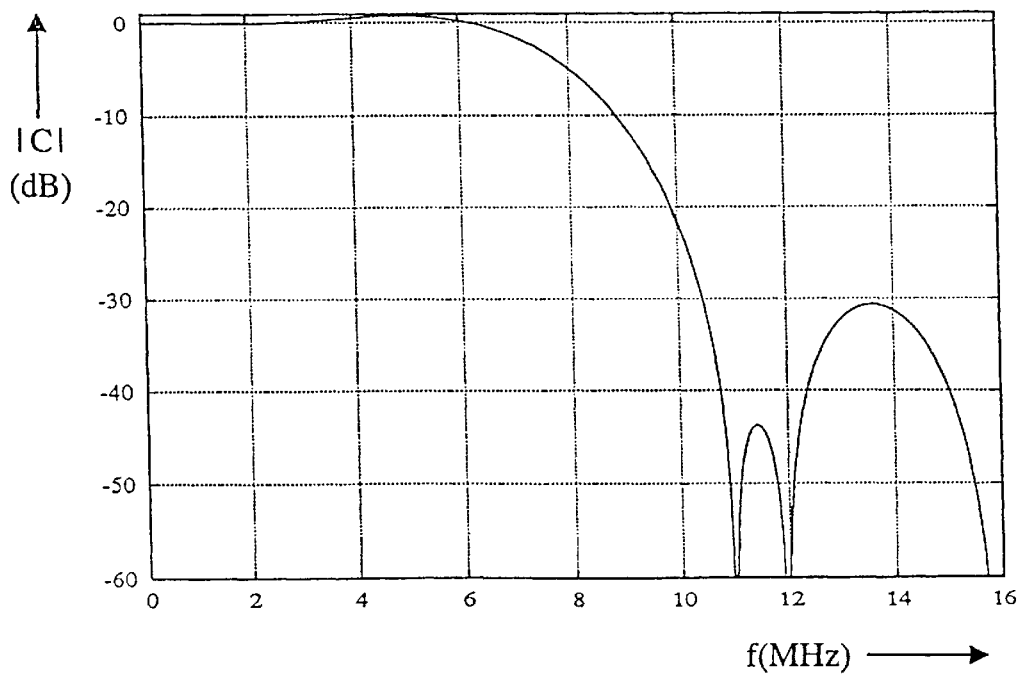
Figure 9B:
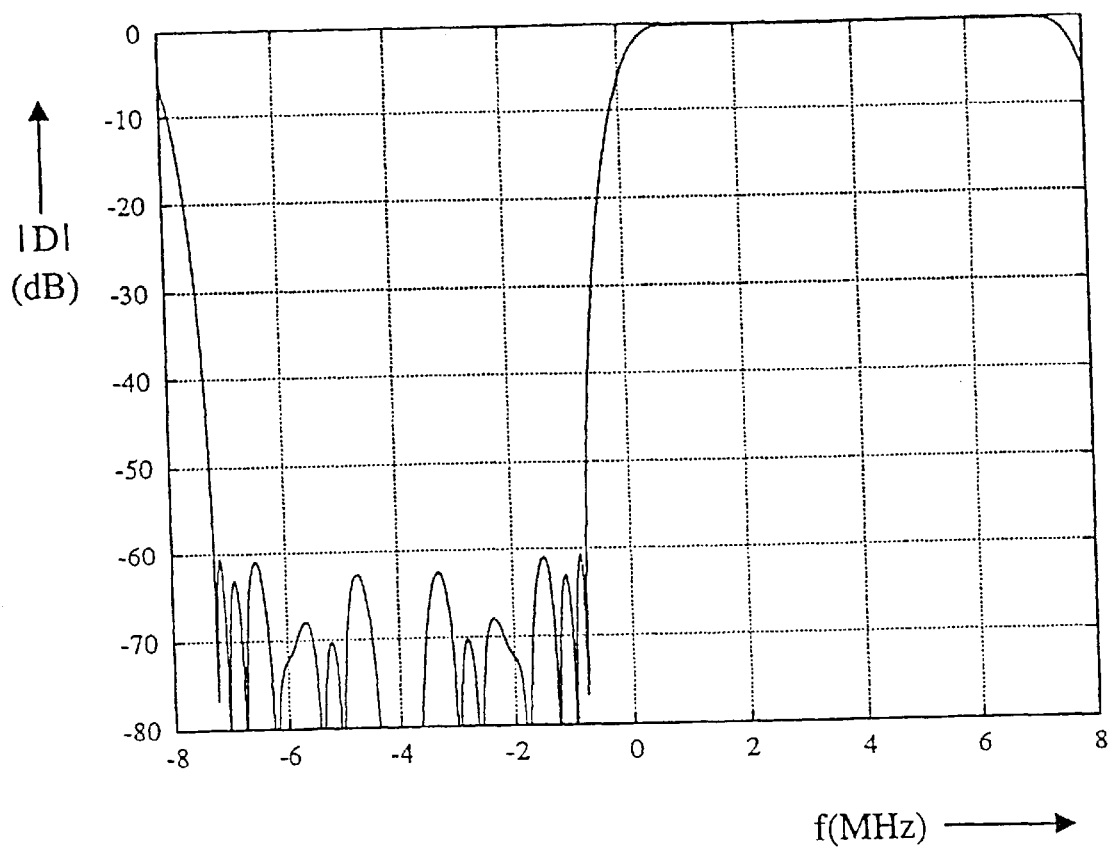
Figures 10A, 10B:
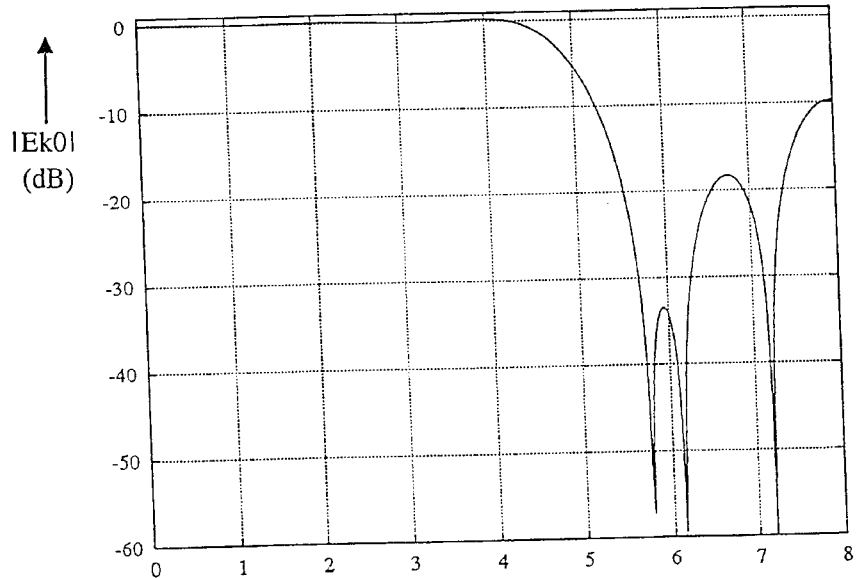
Figures 11A, 11B:
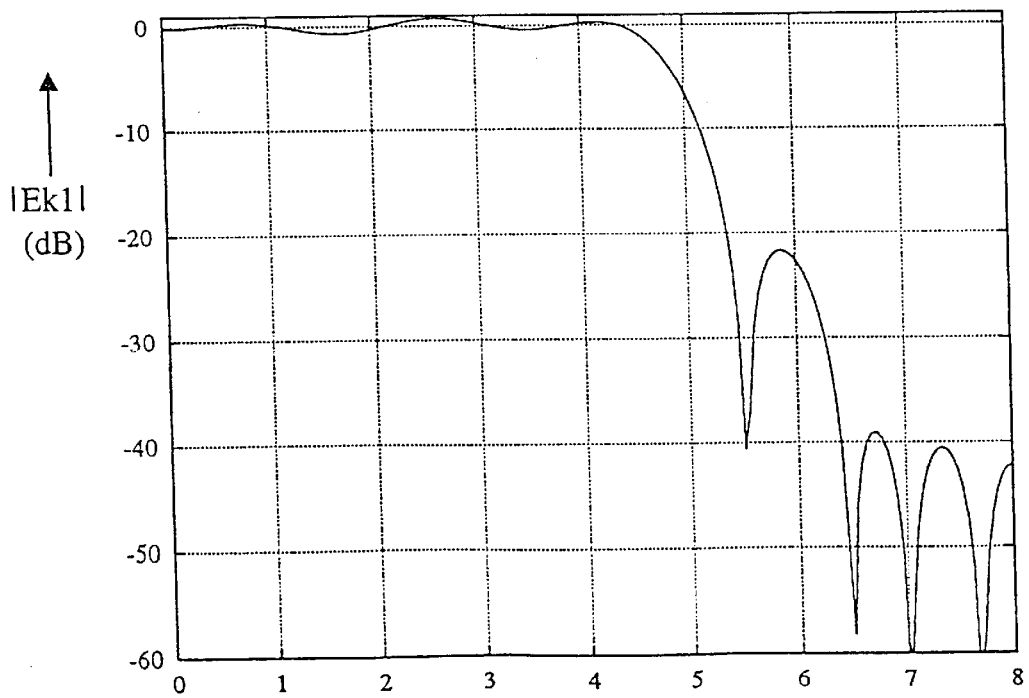
Figures 12A, 12B:
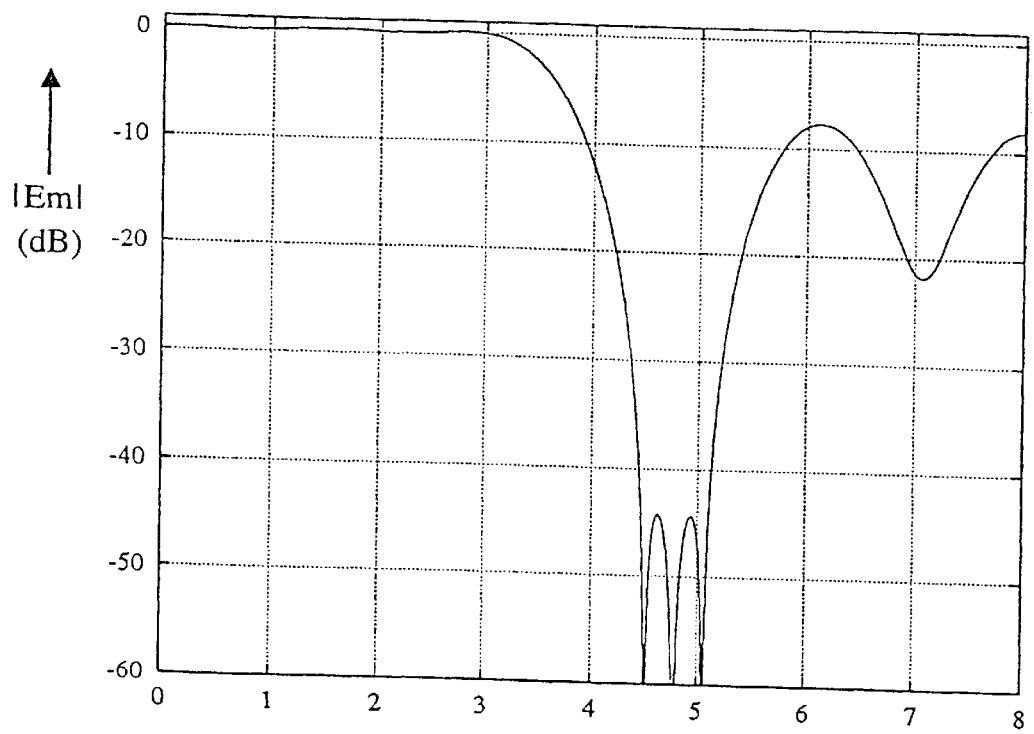
Figure 13B:
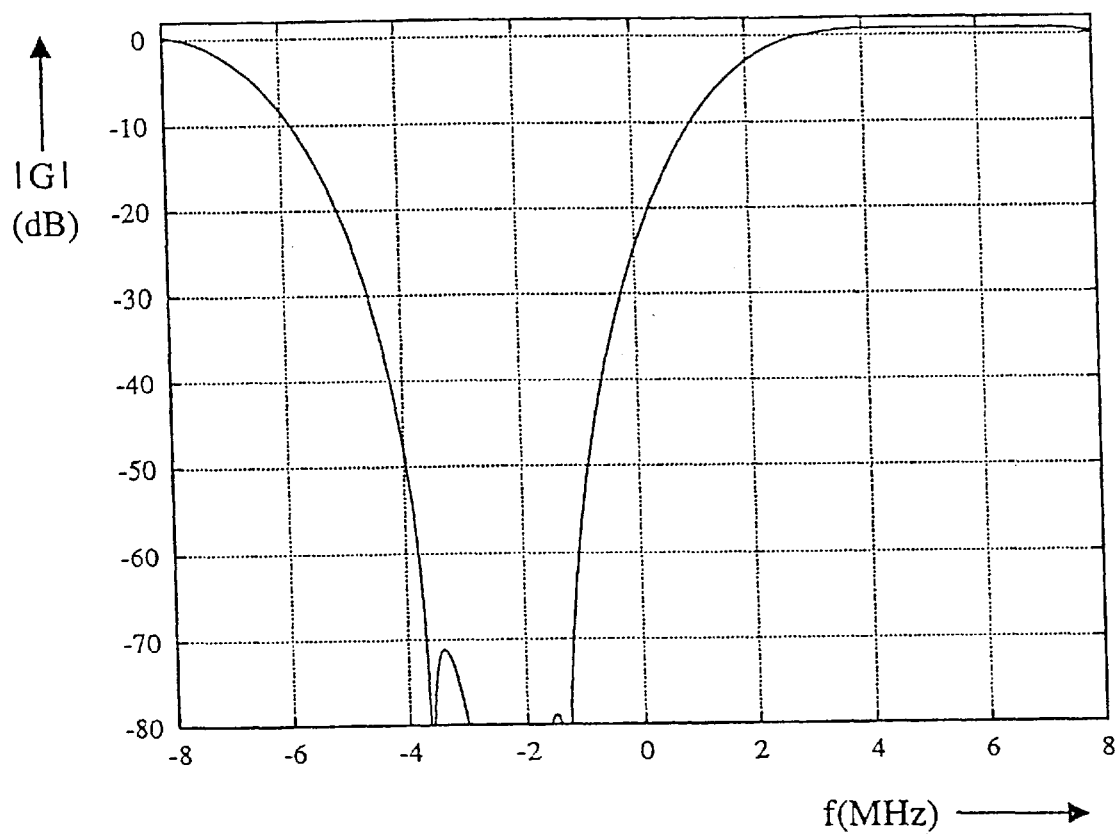
Figures 14A, 14B:
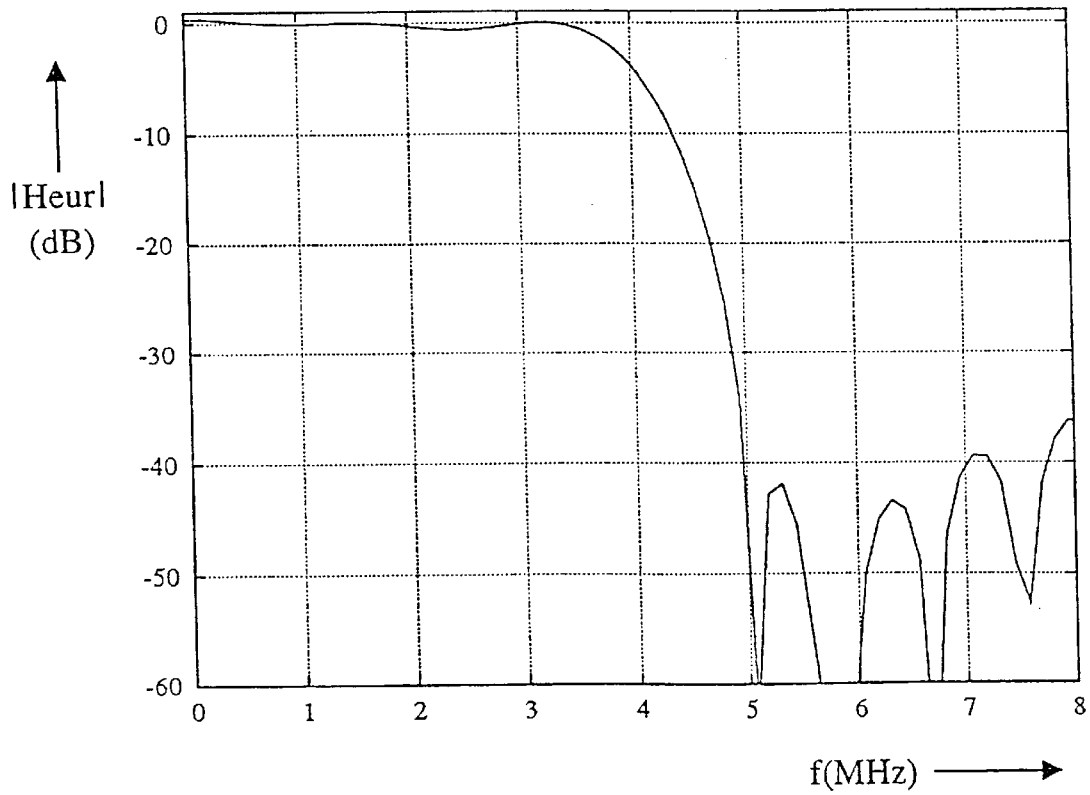
Figures 15A, 15B:
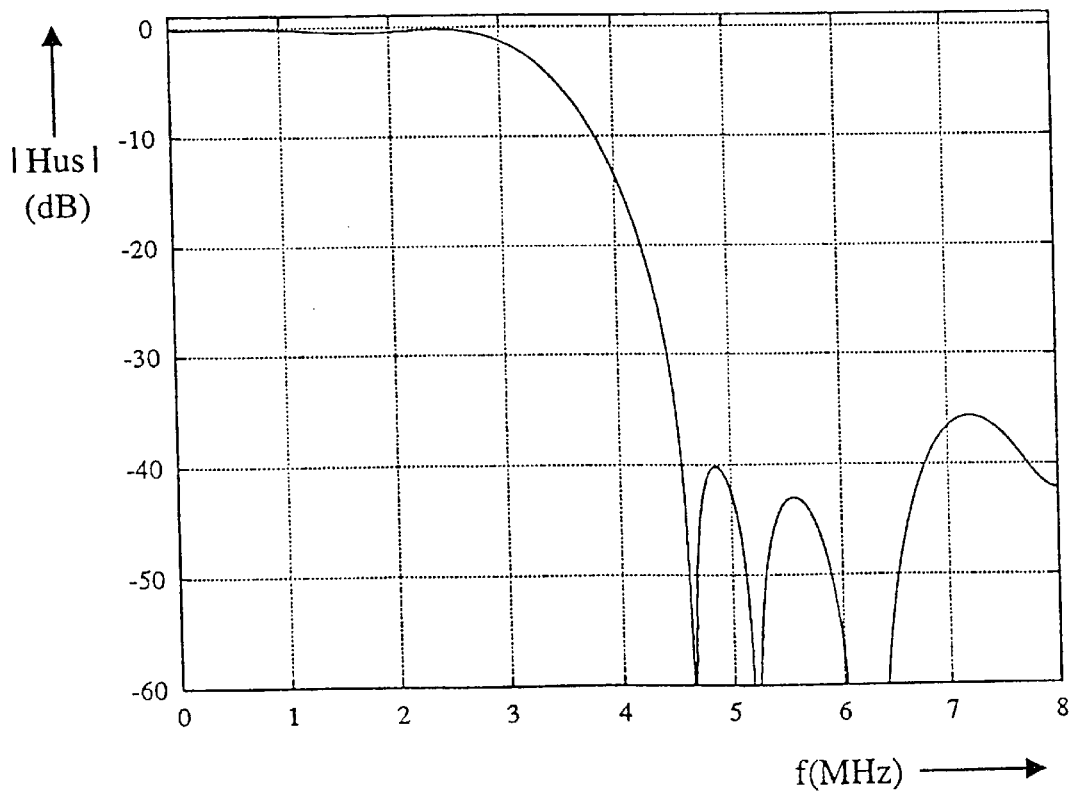

FIGS. 6a, 7a, . . . , 15a list suitable coefficients for the impulse responses Ax(z)/Ay(z), B(z), . . . , Hus(z) of digital filters DF1, DF2, . . . , DF10, respectively. In this respect, it should be noted that each impulse response may be expressed using the z-notation as:

$$\sum_{i=0}^{N} a(i)z^{-i}$$

with N being an integer and representing the length of the impulse response, and a(i) representing the i-th coefficient of the impulse response. In FIGS. 6a, 7a, . . . , 15a, the values of the coefficients are given in decimal notation and in canonical-signed digit notation in the columns entitled VAL (DEC) and VAL(CSD), respectively. FIGS. 6b, 7b, . . . , 15b shows frequency responses associated with the impulses responses of FIG. 6a, 7a, . . . , 15a, respectively. A frequency response is the Fourier transform of the impulse response. With regard to FIGS. 6a, 6b, 7a, 7b, . . . , 15a, 15b, it should be noted that the following conditions apply. The sampling frequency Fs of the A/D converter ADC is 128 MHz. The factors of sample-rate reduction are as follows: R1=2, R2=4 and R3=2.

CLOSING REMARKS

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. For example, with reference to FIG. 5, any of the sample-rate decreasers SRD1, SRD2 and SRD3 may be merged with the digital filter in front of it. In many cases, such a merger will be advantageous. It allows at least a portion of the digital filter in question to operate at a relatively low frequency. This contributes to a low power consumption. In another example, also with reference to FIG. 5, digital filters DF2 and DF3 may be merged to form one filter. Furthermore, the assembly of digital filters DF4–DF10 may be replaced by a single adjustable filter which can provide various frequency responses for suitably processing any content which may be comprised in the vectorial baseband signal Svbb.

It should also be noted that various functions or functional elements may be implemented by means of a suitably programmed computer, either individually or in combination. For example, with reference to FIG. 5, the filter arrangement FIL may be implemented in the form of a signal processor. The signal processor may also comprise other functional elements such as the sound processor SPRC, the video processor VPRC and/or the symbol processor XPRC.

In principle, any type of tuner may be used. For example, with reference to FIG. 5, the tuner TUN may be a single TV tuner such as, for example, the commercially available Philips TV tuner UV916H. It may also be a parallel-arrangement of various TV tuners, each of which has been designed for different transmission standards or groups of transmission standards.

In principle, any type of filter arrangement may be used to provide various frequency responses associated with different transmission standards. Although, in FIG. 5, the filter arrangement FIL is implemented using digital filters DF2–DF10, other types of filters are by no means excluded. For example, the FIG. 5 receiver may be modified by replacing the analog-to-digital converter by a sample-and-hold circuit. In that case, switched-capacitor filters may be used in the filter arrangement FIL instead of digital filters.

Alternatively, if the intermediate frequency signal is not digitized, analog filters may be used for filtering in accordance with the relevant standard. With reference to FIG. 5, it should also be noted that any of the digital filters DF4–DF10 behind the synchronous demodulator SDEM may be replaced by a digital filter in front of the synchronous demodulator SDEM. If all the digital filters DF4–DF10 were replaced in this manner, the filter arrangement FIL would not comprise a synchronous demodulator.

In principle, any type of adjustable frequency converter may be used. Although, in FIG. 5, the adjustable frequency converter AFRC is a digital circuit, analog implementations are by no means excluded. For example, the FIG. 5 receiver may be modified in such a way that an analog-to-digital conversion is carried out behind the adjustable frequency converter instead of in front of it. Furthermore, with reference to the FIG. 5 receiver, it is possible to implement the adjustable frequency converter AFRC using digital multiplier circuits in connection with read-only memories comprising sine and cosine tables for generating a vectorial mixing signal. However, an implementation based on a Cordic processor, as discussed hereinbefore in connection with FIG. 5, is generally more hardware-efficient and cost-efficient.

Any reference signs between parentheses shall not be construed as limiting the claim concerned.

What is claimed is:

1. A receiver comprising:
    a tuner for converting a reception signal to an intermediate-frequency signal; and
    a filter arrangement capable of providing respectively different frequency responses associated with respectively different transmission standards,
    wherein the receiver includes an adjustable frequency converter for converting the intermediate-frequency signal to an input signal for the filter arrangement, and the frequency responses provided by the filter arrangement have passbands that include zero frequency.

2. The receiver of claim 1, wherein the adjustable frequency converter includes a vectorial mixer for effectively multiplying the intermediate-frequency signal by a vectorial signal having a single mixing frequency, the result of this multiplication constituting the input signal for the filter arrangement.

3. The receiver of claim 2, wherein the receiver includes a sampling circuit for applying the input signal to the vectorial mixer in a time-discrete form.

4. An integrated receiver-circuit for processing an intermediate-frequency signal provided by a tuner, the integrated receiver-circuit comprising:
    a filter arrangement capable of providing respectively different frequency responses associated with respectively different transmission standards; and
    an adjustable frequency converter for converting the intermediate-frequency signal to an input signal for the filter arrangement,
    wherein the frequency responses provided by the filter arrangement have passbands that include zero frequency.

* * * * *